United States Patent
Li et al.

(10) Patent No.: US 10,788,691 B2
(45) Date of Patent: Sep. 29, 2020

(54) PIXEL UNIT HAVING FIRST AND SECOND LIGHT SHIELDING LAYERS AND METHOD FOR MANUFACTURING THE SAME, DISPLAY PANEL AND METHOD FOR DRIVING THE SAME

(71) Applicant: BOE TECHNOLOGY GROUP CO., LTD., Beijing (CN)

(72) Inventors: Zhongxiao Li, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/243,720

(22) Filed: Jan. 9, 2019

(65) Prior Publication Data

US 2019/0317343 A1    Oct. 17, 2019

(30) Foreign Application Priority Data

Apr. 17, 2018  (CN) .......................... 2018 1 0342906

(51) Int. Cl.
*G02F 1/13* (2006.01)
*G09G 3/36* (2006.01)
(Continued)

(52) U.S. Cl.
CPC ...... *G02F 1/1323* (2013.01); *G02F 1/133512* (2013.01); *G02F 1/133514* (2013.01);
(Continued)

(58) Field of Classification Search
CPC ............. G02F 1/1323; G02F 1/133512; G02F 1/133514; G02F 1/134363; G02F 2201/52;
(Continued)

(56) References Cited

U.S. PATENT DOCUMENTS 9,257,081 B2   2/2016  Nakayama et al.
9,715,143 B2   7/2017  Li et al.
(Continued)

FOREIGN PATENT DOCUMENTS

CN   103163683 A   6/2013
CN   103339557 A   10/2013
(Continued)

OTHER PUBLICATIONS

First Chinese Office Action dated Jul. 15, 2020, for corresponding Chinese Application No. 201810342906.X.

*Primary Examiner* — Lisa S Landis
(74) *Attorney, Agent, or Firm* — Kinney & Lange, P.A.

(57) ABSTRACT

The present disclosure provides a pixel unit and a method for manufacturing the same, a display panel and a method for driving the same. The pixel unit includes: a first substrate; an intermediate stack disposed on the first substrate; a first light shielding layer disposed on one side of the intermediate stack adjacent to the first substrate, wherein the first light shielding layer has an opening provided therein; and a second light shielding layer disposed on one side of the intermediate stack away from the first substrate. The second light shielding layer is disposed so that projection of the opening on the first substrate is located within projection of the second light shielding layer on the first substrate.

18 Claims, 6 Drawing Sheets

(51) Int. Cl.
*G02F 1/1335* (2006.01)
*G02F 1/1343* (2006.01)

(52) U.S. Cl.
CPC ......... *G09G 3/36* (2013.01); *G02F 1/134363* (2013.01); *G02F 2201/52* (2013.01); *G09G 2320/068* (2013.01); *G09G 2358/00* (2013.01)

(58) Field of Classification Search
CPC . G09G 3/36; G09G 2320/068; G09G 2358/00
See application file for complete search history.

(56) References Cited

U.S. PATENT DOCUMENTS

| | | | |
|---|---|---|---|
| 10,204,573 | B2 | 2/2019 | Chu-Ke et al. |
| 2013/0155034 | A1* | 6/2013 | Nakayama ............ G02F 1/1343 345/204 |
| 2013/0300989 | A1 | 11/2013 | Hibayashi et al. |
| 2019/0079352 | A1* | 3/2019 | Park ................... G02F 1/13306 |

FOREIGN PATENT DOCUMENTS

| | | |
|---|---|---|
| CN | 104122705 A | 10/2014 |
| CN | 105954901 A | 9/2016 |
| CN | 106773268 A | 5/2017 |

\* cited by examiner

PIXEL UNIT HAVING FIRST AND SECOND LIGHT SHIELDING LAYERS AND METHOD FOR MANUFACTURING THE SAME, DISPLAY PANEL AND METHOD FOR DRIVING THE SAME

CROSS-REFERENCE TO RELATED APPLICATION

This application claims priority to Chinese Patent Application No. 201810342906.X, filed on Apr. 17, 2018, which is herein incorporated by reference in its entirety.

BACKGROUND

The present disclosure relates to the field of display technologies, and more particularly to a pixel unit and a method for manufacturing the same, and to a display panel and a method for manufacturing the same.

With the development of display technologies, the demands for display privacy are becoming higher and higher. For example, it is desired by users that contents presented on a display screen may be visible only to users within a desired range, and are either invisible or disturbed/disrupted to users outside the desired range. Currently, some technologies realize an anti-peep function by additionally providing an anti-peep switching device on a display or providing a switchable backlight structure inside the display.

SUMMARY

The present disclosure provides a pixel unit and a method for manufacturing the same, a display panel and a method for driving the same.

According to an aspect of the present disclosure, there is provided a pixel unit, comprising: a first substrate; an intermediate stack disposed on the first substrate; a first light shielding layer disposed on one side of the intermediate stack adjacent to the first substrate, wherein the first light shielding layer has an opening provided therein; and a second light shielding layer disposed on one side of the intermediate stack away from the first substrate. The second light shielding layer is disposed so that projection of the opening on the first substrate is located within projection of the second light shielding layer on the first substrate.

In an example, the pixel unit further comprises a second substrate disposed on the intermediate stack, wherein the second light shielding layer is disposed in the second substrate; and the first light shielding layer is disposed on the first substrate and is at least partially covered by the intermediate stack.

In an example, a center of the projection of the opening on the first substrate coincides with a center of the projection of the second light shielding layer on the first substrate.

In an example, a center of the projection of the opening on the first substrate deviates from a center of the projection of the second light shielding layer on the first substrate.

In an example, the first light shielding layer and the second light shielding layer are configured to satisfy the following formula: $b = a + \tan\theta_1 \times h + \tan\theta_2 \times h$, where a represents a width of the opening, b represents a width of the second light shielding layer, h represents a distance between the first light shielding layer and the second light shielding layer, $\theta_1$ represents an angle of a light path from an edge of the opening to an edge of the second light shielding layer on one side of the opening with respect to a normal of the first substrate, and $\theta_2$ represents an angle of a light path from an edge of the opening to an edge of the second light shielding layer on the other side of the opening opposite to said one side with respect to the normal of the first substrate.

In an example, the opening has a slit shape.

In an example, each of the first light shielding layer and the second light shielding layer is a black matrix.

In an example, the intermediate stack comprises: a first flat layer disposed on the first substrate to at least partially cover the first light shielding layer; a common electrode disposed on the first flat layer; an insulating layer disposed on the common electrode; a pixel electrode disposed on the insulating layer; a liquid crystal layer disposed on the pixel electrode; and a second flat layer disposed on the liquid crystal layer.

According to another aspect of the present disclosure, there is provided a display panel, comprising: a plurality of display pixel units arranged in an array; and at least one interfering pixel unit distributed in the array, wherein each of the at least one interfering pixel unit is implemented using the pixel unit described above.

In an example, the at least one interfering pixel unit is disposed between respective adjacent ones of the display pixel units.

In an example, each of the display pixel units comprises a plurality of sub-pixels, and the at least one interfering pixel unit is disposed between respective adjacent ones of the sub-pixels.

In an example, the at least one interfering pixel unit comprises a first interfering pixel unit and a second interfering pixel unit, wherein the first interfering pixel unit is different from the second interfering pixel unit in at least one of: a width of an opening, a width of a second light shielding layer, a distance between a first light shielding layer and the second light shielding layer, and an offset value of a center of projection of the second light shielding layer on a first substrate with respect to a center of projection of the opening on the first substrate.

In an example, the first interfering pixel unit and the second interfering pixel unit are distributed in the array in a periodically repeating manner.

According to yet another aspect of the present disclosure, there is provided a method for manufacturing the pixel unit described above, comprising: forming a first substrate; forming a first light shielding layer on the first substrate; forming an opening in the first light shielding layer; forming an intermediate stack on the first light shielding layer; and forming a second light shielding layer on the intermediate stack, so that projection of the opening on the first substrate is located within projection of the second light shielding layer on the first substrate.

According to a further aspect of the present disclosure, there is provided a method for driving the display panel described above, comprising: in a normal display mode, providing a display data signal to display pixel units in the display panel; and in an anti-peep display mode, providing the display data signal to the display pixel units in the display panel, and providing an interference data signal to at least a part of the at least one interfering pixel unit in the display panel.

In an example, the interfering pixel units are disabled in the normal display mode.

In an example, the interfering pixel units comprise a first interfering pixel unit and a second interfering pixel unit, wherein the first interfering pixel unit is different from the second interfering pixel unit in at least one of: a width of an opening, a width of a second light shielding layer, a distance between a first light shielding layer and the second light shielding layer, and an offset value of a center of projection of the second light shielding layer on a first substrate relative to a center of projection of the opening on the first substrate, and the method further comprises: in the anti-peep display mode, selecting one or both of the first interfering pixel unit and the second interfering pixel unit according to an angle range desired for picture presentation, wherein said providing an interference data signal comprises providing the interference data signal to the selected interfering pixel unit(s).

In an example, the method further comprises: identifying a position where an observer is located through biometric identification; and determining the angle range required for picture presentation according to the position where the observer is located.

In an example, the interference data signal is a Voltage OPerating (VOP) signal for the display panel.

The present summary is provided only by way of example, and not limitation. Other aspects of the present disclosure will be appreciated in view of the entirety of the present disclosure, including the entire text, claims, and accompanying figures.

Figure 1:
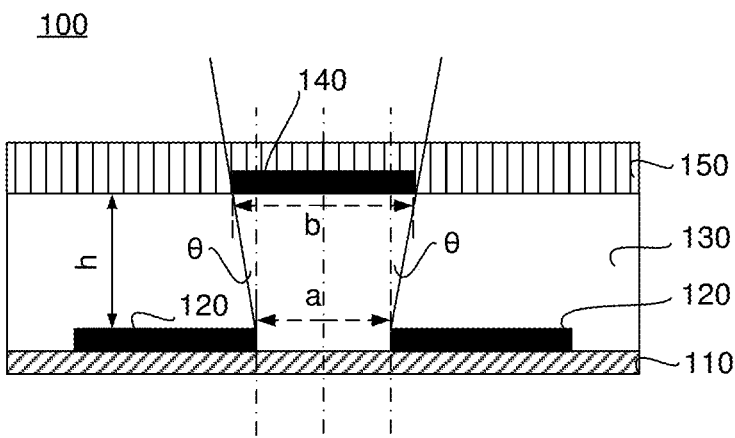
FIG. 1 illustrates a cross-sectional view of an exemplary structure of a pixel unit according to an embodiment of the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Specific embodiments of the present disclosure will be described in detail below. It should be illustrated that the embodiments described here are for illustrative purposes only and are not intended to limit the present disclosure. In the following description, numerous specific details are set forth in order to provide a thorough understanding of the present disclosure. However, it will be apparent to those of ordinary skill in the art that the present disclosure may be practiced without these specific details. In other instances, well-known circuits, materials, or methods have not been described in detail in order to avoid obscuring the present disclosure.

Throughout the specification, references to "one embodiment", "an embodiment", "one example" or "an example" are intended to mean that particular features, structures, or characteristics described in connection with the embodiment or example are included in at least one embodiment of the present disclosure. Therefore, phrases "in one embodiment", "in an embodiment", "one example" or "an example" appearing throughout the specification do not necessarily refer to the same embodiment or example. Furthermore, the particular features, structures, or characteristics may be combined in one or more embodiments or examples in any suitable combination and/or sub-combination. In addition, it should be understood by those of ordinary skill in the art that the accompanying drawings are provided here for the purpose of illustration, and the accompanying drawings are not necessarily drawn to scale. The term "and/or" used here comprises any and all combinations of one or more of associated listed items.

Embodiments of the present disclosure will be described below with reference to the accompanying drawings.

The embodiments of the present disclosure provide a pixel unit and a method for manufacturing the same, as well as a display panel and a method for driving the same. The pixel unit according to the embodiment of the present disclosure may be used in a display panel to replace a part of pixels in the display panel, thereby realizing an anti-peep function.

FIG. 1 illustrates a cross-sectional view of an exemplary structure of a pixel unit 100 according to an embodiment of the present disclosure.

As shown in FIG. 1, the pixel unit 100 comprises a first substrate 110, a first light shielding layer 120, an intermediate stack 130, and a second light shielding layer 140.

The first substrate 110 may be a transparent substrate such as a glass substrate. For example, the first substrate 110 may be an array substrate.

The intermediate stack 130 is located on the first substrate 110 and may comprise at least one of the following layers: a flat layer, a liquid crystal layer, a driving array, a pixel electrode, an insulating layer, a common electrode, etc.

The first light shielding layer 120 is disposed on one side of the intermediate stack adjacent to the first substrate 110, for example, disposed on the first substrate 110, and is at least partially covered by the intermediate stack 130. The first light shielding layer 120 may be implemented using a black matrix and has an opening formed therein, wherein the opening may be designed in a form of a slit, as shown in FIG. 1.

The second light shielding layer 140 is disposed on one side of the intermediate stack 130 away from the first substrate 110, and may be implemented using a black matrix. In some embodiments, the pixel unit 100 may further comprise a second substrate 150, which may also be a transparent substrate, such as a glass substrate, and the second light shielding layer 140 may be disposed in the second substrate 150. For example, the second substrate 150 may be a color film substrate having a black matrix and a color film layer of the display panel, and the second light shielding layer 140 may be disposed in the same layer as that of the black matrix and the color film layer in the color film substrate.

The first light shielding layer 110 and the second light shielding layer 140 are positioned and sized so that projection of the opening on the first substrate 110 is within projection of the second light shielding layer 140 on the first substrate 110, as shown in FIG. 1. This may be realized by placing the second light shielding layer 120 having an area greater than that of the opening above the opening. In FIG. 1, the opening is designed in a form of a slit, and the second light shielding layer 140 is designed to have a shape and a size corresponding to those of the slit, so that a geometric central point of the slit is located directly below a geometric central point of the second light shielding layer 140. Thereby, a center of the projection of the opening on the first substrate 110 coincides with a center of the projection of the second light shielding layer 140 on the first substrate 110. The so-called center here may be a geometric center, a center of gravity, or another central position.

In this case, the first light shielding layer 120 and the second light shielding layer 140 may be designed to satisfy the following formula:

$$b = a + 2 \times \tan\theta \times h$$

where a represents a width of the opening, b represents a width of the second light shielding layer 140, and h represents a distance between the first light shielding layer 120 and the second light shielding layer 140. Since the second light shielding layer 140 is located directly above the opening, an angle of a light path from an edge of the opening to an edge of the second light shielding layer 140 on one side of the opening is identical to that on the other side of the opening opposite to said one side, and the angle is represented by θ, as shown in FIG. 1. Here, θ may also be understood as corresponding to an angle required for antipeep display at an refractive index of an internal medium of the pixel unit, for example, if the required angle is ±20°, then θ=20°. Considering light refraction caused by a difference in refractive index between an external medium of the pixel unit and the internal medium of the pixel unit, there is a certain difference between an anti-peep angle achieved in actual display and the angle, which will be further described below. The so-called normal refers to a straight line perpendicular to a plane where the first substrate 110 is located, as indicated by dot dashed lines in FIG. 1.

The pixel unit 100 of FIG. 1 has a symmetrical structure, so that the pixel unit 100 may provide a symmetrical angle range for presenting a normal picture, for example, −20°~−20°, −10°~−10°, etc.

Figure 2:
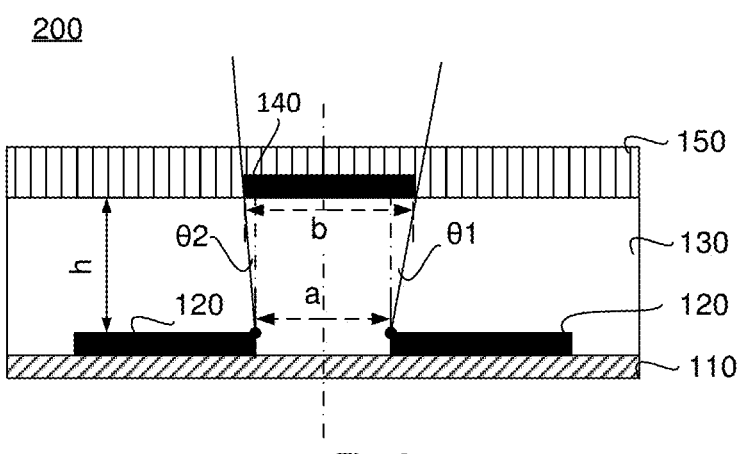
FIG. 2 illustrates a cross-sectional view of an exemplary structure of a pixel unit according to another embodiment of the present disclosure.

FIG. 2 illustrates a cross-sectional view of an exemplary structure of a pixel unit 200 according to another embodiment of the present disclosure. The embodiment of FIG. 2 is similar to that of FIG. 1, except at least that, in FIG. 2, a center of projection of the second light shielding layer 140 on the first substrate 110 deviates from a center of projection of the opening of the first light shielding layer 120 on the first substrate. In other words, the second light shielding layer 140 is not directly above the opening but has a certain offset with respect to the opening. Hereinafter, for the sake of clarity, only the different parts will be described in detail.

In this case, an angle of a light transmission path defined by an edge of the opening and an edge of the second light shielding layer 140 with respect to the normal of the first substrate 110 on one side (left side in FIG. 2) is different from that on the other side (left side and right side in FIG. 2) of the opening opposite to side one side. The first light shielding layer 120 and the second light shielding layer 140 may be configured to satisfy the following formula:

$$b = a + \tan\theta_1 \times h + \tan\theta_2 \times h,$$

where b represents a width of the second light shielding layer 140, h represents a distance between the first light shielding layer 120 and the second light shielding layer 140, θ1 represents an angle of a light path from an edge of the opening to an edge of the second light shielding layer on one side of the opening with respect to the normal of the first substrate, and θ2 represents an angle of a light path from an edge of the opening to an edge of the second light shielding layer on the other side of the opening opposite to the one side with respect to the normal of the first substrate.

The pixel unit 200 in FIG. 2 has different angles θ1 and θ2 for defining a light transmission range on opposite sides of the normal of the substrate. That is, the pixel unit 200 has an asymmetrical structure. Therefore, the pixel unit 200 may provide an asymmetrical angle range for presenting a normal picture, for example, 10°~30°, −30°~−10°, etc.

Figure 3:
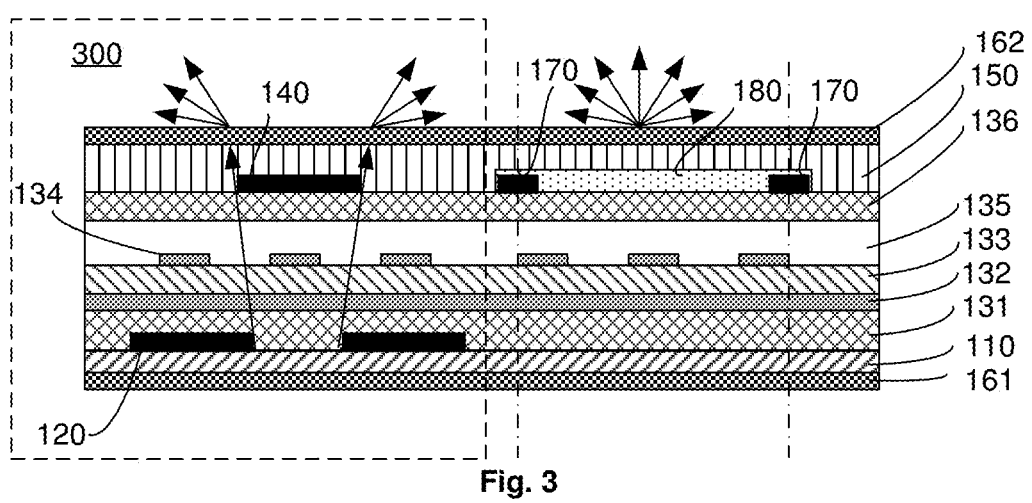
FIG. 3 illustrates a cross-sectional view of an exemplary structure of a pixel unit according to yet another embodiment of the present disclosure.

FIG. 3 illustrates a cross-sectional view of an exemplary structure of a pixel unit 300 according to yet another embodiment of the present disclosure. In FIG. 3, in order to explain a relationship between the pixel unit 300 for providing interference in the present embodiment and a pixel unit for normal display, both of the pixel units are shown together in the figure, wherein the pixel unit 300 for providing interference according to the embodiment of the present disclosure (as indicated by a dashed box) is shown on the left side, and the pixel unit for normal display (as defined by two dot dashed lines) is shown on the right side. The pixel unit 300 of FIG. 3 is similar to that of FIG. 1, except at least that the pixel unit 300 of FIG. 3 further comprises a first polarizer 161 and a second polarizer 162, and has a different structure of the intermediate stack 130. Hereinafter, for the sake of clarity, only the different parts will be described in detail.

As shown in FIG. 3, the pixel unit 300 comprises a first substrate 110, a first light shielding layer 120, an intermediate stack 130, a second light shielding layer 140, a second substrate 150, a first polarizer 161, and a second polarizer 162. The first polarizer 161 is disposed below the first substrate 110, and the second polarizer 162 is disposed above the second substrate 150. The first substrate 110, the intermediate stack 130, the second substrate 150, the first polarizer 161, and the second polarizer 162 may be shared between the pixel unit 300 and the pixel unit for normal display on the display panel. For example, in the second substrate 150, the second light shielding layer 140 of the pixel unit 300 may be disposed in the same layer as that of a black matrix 170 and a color film layer 180 of the display pixel for normal display.

The intermediate stack 130 comprises a first flat layer 131, a common electrode 132, an insulating layer 133, a pixel electrode 134, a liquid crystal layer 135, and a second flat layer 136. The first flat layer 131 is disposed on the first substrate to at least partially cover the first light shielding layer. The common electrode 132 is disposed on the first flat layer. The insulating layer 133 is disposed on the common electrode. The pixel electrode 134 is disposed on the insulating layer. The liquid crystal layer 135 is disposed on the pixel electrode. The second flat layer 136 is disposed on the liquid crystal layer.

Transmission axis directions of the first polarizer 161 and the second polarizer 162 may be perpendicular to each other, and an initial alignment direction of liquid crystal in the liquid crystal layer 135 may be perpendicular to or parallel to the transmission axis direction of the first polarizer 161.

A propagation direction of light is schematically illustrated by arrowed lines in FIG. 3.

As shown in FIG. 3, the pixel unit for normal display has a large light exit range, and may generally achieve a viewing range of 160° or more in a case of a contrast of 10° or more.

In contrast, the pixel unit 300 for providing interference has a small light exit range due to the limitation of the two light shielding layers. As shown in FIG. 3, for example, after light emitted by a backlight module enters the pixel unit 300, the light is blocked by the first light shielding layer 120 and thus is emitted upward through the opening. Then, the light emitted through the opening is blocked again due to the presence of the second light shielding layer 140, and thus is transmitted to the second substrate 150 within an angle range defined by the arrowed lines in FIG. 3 and the first substrate 110. Then, due to the difference in refractive index between an internal medium of the pixel unit 300 and the outside air, the light is refracted on an upper surface of the pixel unit 300, and then is emitted in a direction indicated by the arrows. The light may not propagate towards the outside from the pixel unit 300 in an intermediate angle range without an arrowed line, and therefore there is no interference in the angle range. Thereby, an observer located in the angle range may see a normal display picture. This angle range is hereinafter referred to as an anti-peep angle range.

It should be illustrated that although the first light shielding layer 120 is illustrated as being located on the first substrate 110 and the second light shielding layer 140 is illustrated as being located on the intermediate stack 130 in the embodiment described above, this is merely an example, and the embodiments of the present disclosure are not limited thereto. The first light shielding layer 120 and the second light shielding layer 140 may also be disposed at other positions in the pixel unit as needed, for example, disposed in the intermediate stack 130. In addition, a backlight module for providing backlight may further be disposed below the first substrate 110. In addition, the pixel units 100, 200, and 300 described above with reference to FIGS. 1-3 may be based on an Advanced Super Dimension Switch (ADS) display mode. However, the embodiments of the present disclosure are not limited thereto, and the pixel unit for providing interference may also be based on an In-Plane-Switching (IPS) display mode, which is similar to the ADS display mode except for an electrode structure. In addition, the above-mentioned "left side" and "right side" as well as "one side" and "the other side" are only intended to indicate opposite sides of each other for the purpose of clarity of description without limitations.

The pixel unit according to the embodiment of the present disclosure may be used in a display panel to replace a part of pixels or sub-pixels in the display panel, thereby realizing an anti-peep function. This will be described below with reference to FIGS. 4-6.

Figure 4:
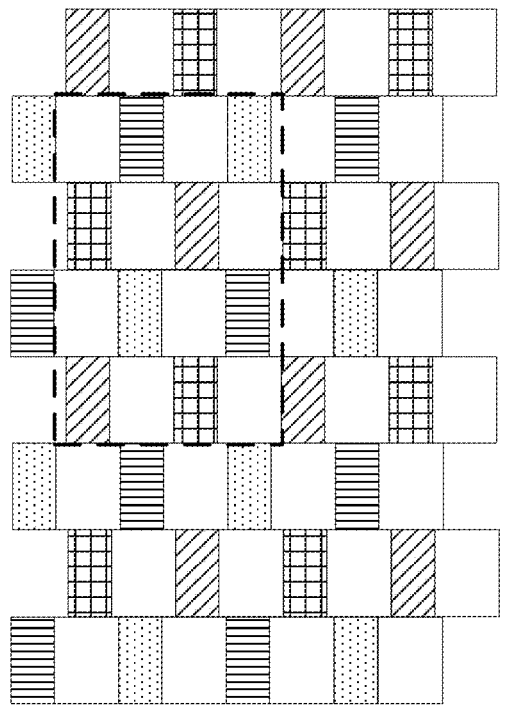
FIG. 4 illustrates a schematic diagram of a display panel according to an embodiment of the present disclosure.
Figure 4:
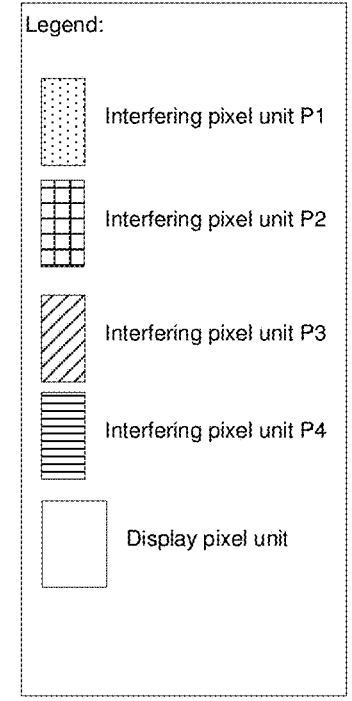

FIG. 4 illustrates a schematic diagram of a display panel according to an embodiment of the present disclosure, in which only a schematic diagram of an arrangement of a part of pixel units in the display panel is shown for clarity. As shown in FIG. 4, the display panel comprises a plurality of display pixel units arranged in an array and at least one interfering pixel unit distributed in the array. The display pixel units are used for normal display, and have a structure, for example, as shown on the right side in FIG. 3. Of course, the embodiments of the present disclosure are not limited thereto, and other structures may be selected as needed. The interfering pixel unit(s) may be implemented using any of the pixel units 100 to 300 described above with reference to FIGS. 1-3 to provide interference, thereby realizing an anti-peep function.

The interfering pixel units may be divided into multiple types of interfering pixel units by designing different parameters for the interfering pixel units, thereby achieving different anti-peep angle ranges. The parameters comprise, but not limited to, a width a of an opening, a width b of a second light shielding layer, a distance h between a first light shielding layer and the second light shielding layer, an offset of a center of projection of the second light shielding layer on a first substrate with respect to a center of projection of the opening on the first substrate, etc. In FIG. 4, the interfering pixel units are divided into four types of interfering pixel units, which are an interfering pixel unit P1, an interfering pixel unit P2, an interfering pixel unit P3, and an interfering pixel unit P4 respectively. These interfering pixel units P1 to P4 are different from each other in at least one of a width a of an opening, a width b of a second light shielding layer, a distance h between a first light shielding layer and the second light shielding layer, and angles θ of light paths from edges of the opening to edges of the second light shielding layer with respect to a normal of a first substrate. Exemplary parameters of the interfering pixel units P1-P4 are given in Table 1 below.

TABLE 1

|  | P1 | P2 | P3 | P4 |
| --- | --- | --- | --- | --- |
| Width a of the opening (μm) | 15 | 15 | 15 | 15 |
| Distance h (μm) | 15 | 15 | 15 | 15 |
| Width b of the second light shielding layer (μm) | 22 | 22 | 22 | 18.5 |
| Offset (μm) | 1.75 | −1.75 | 0 | 0 |
| Anti-peep angle range | 10°~30° | −30°~−10° | −20°~20° | −10°~10° |

The offset in Table 1 refers to an offset of a center of projection of the second light shielding layer on the first substrate with respect to a center of projection of the opening on the first substrate. An offset of 0 indicates that the second light shielding layer is located directly above the opening, for example as shown in FIG. 1. A positive offset indicates an offset towards one side (for example, the right side) of the pixel unit, and a negative offset indicates an offset towards the other side (for example, the left side) of the pixel unit, for example, as shown in FIG. 2. The anti-peep angle range in Table 1 refers to an angle range in which a user on a light exit side of the display panel is provided with a normal display picture, as defined above. A negative lower limit value or an upper limit value of the anti-peep angle range indicates an angle with respect to one side of the normal of the first substrate, and a positive lower limit value or upper limit value of the anti-peep angle range indicates an angle with respect to the other side of the normal of the first substrate opposite to the one side.

As may be seen from Table 1, the interfering pixel units P1 to P4 have the same width a of the opening and the same width b of the second light shielding layer, the distance h between the first light shielding layer and the second light shielding layer of the interfering pixel unit P4 is less than those of the interfering pixel units P1 to P3, the center of the second light shielding layer has an offset of 1.75 μm towards one side with respect to the center of the opening in the interfering pixel unit P1, the center of the second light shielding layer has an offset of 1.75 μm towards the other side with respect to the center of the opening in the interfering pixel unit P2, and the second light shielding layers are located directly above the respective openings without an offset in the interfering pixel units P3 and P4. The interfering pixel units P1 to P4 may realize four different anti-peep angle ranges, respectively. A plurality of different anti-peep angle ranges may be realized by selecting one or more of the interfering pixel units P1 to P4.

The interfering pixel units P1 to P4 are distributed in an array of display pixel units. The display pixel units provide a normal display picture, and the interfering pixel units provide an interference picture. The normal display picture and the interference picture are superimposed, so that a user on a light exit side of the display panel may see the normal display picture on the display panel only in the anti-peep angle range, thereby realizing an anti-peep function.

As shown in FIG. 4, each of the interfering pixel units P1 to P4 are disposed between adjacent ones of the display pixel units in a periodically repeating manner. In FIG. 4, the interfering pixel units P1 to P4 and the display pixel units are alternately disposed in rows and/or columns of the pixel array. For example, in a first row, the interfering pixel unit P2 and the interfering pixel unit P3 are alternately disposed between adjacent display pixel units; in a second row, the interfering pixel unit P1 and the interfering pixel unit P4 are alternately disposed between adjacent display pixel units; a third row has the same arrangement as that of the first row, except that the third row has a shift of one pixel unit relative to the first row; a fourth row has the same arrangement as that of the second row, except that the fourth row has a shift of one pixel unit relative to the second row, and so on, thereby forming a periodically repeating arrangement pattern. One such repeating unit is shown by a dashed box in FIG. 4.

Figure 5:
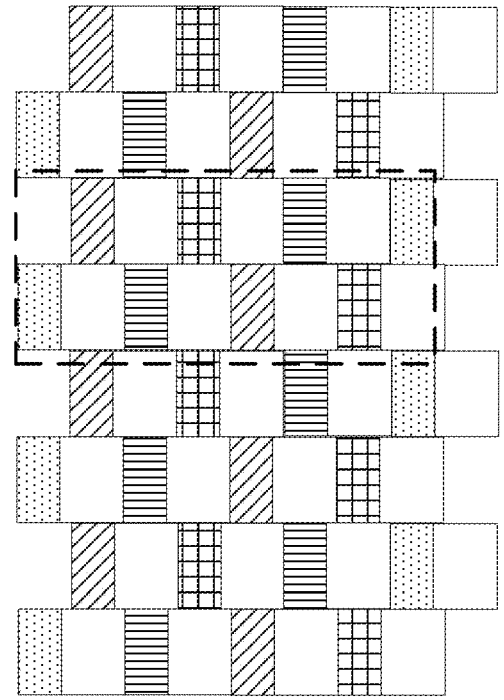
FIG. 5 illustrates a schematic diagram of a display panel according to another embodiment of the present disclosure.
Figure 5:
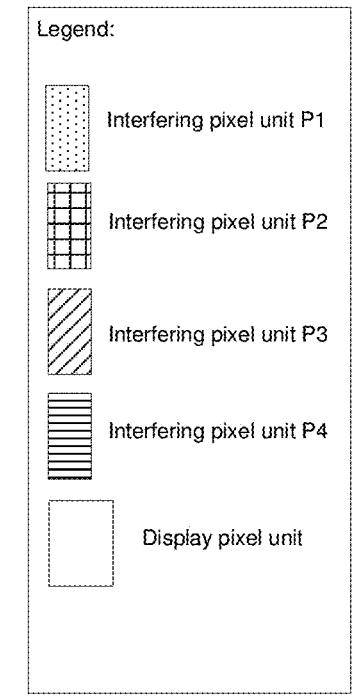

FIG. 5 illustrates a schematic diagram of a display panel according to another embodiment of the present disclosure. The display panel of FIG. 5 is similar to that of FIG. 4, except at least for an arrangement of the interfering pixel units and the display pixel units. For the sake of clarity, only the different parts will be described in detail below. As shown in FIG. 5, each of the interfering pixel units P1 to P4 is alternately disposed between respective display pixel units in each row of the array, thereby forming a periodically repeating arrangement pattern. One such repeating unit is as shown by a dashed box.

The pixel units 100 to 300 described above with reference to FIGS. 1 to 3 may be used as the interfering pixel units to replace a part of the pixels in the display panel, thereby realizing a anti-peep function.

Figure 6:
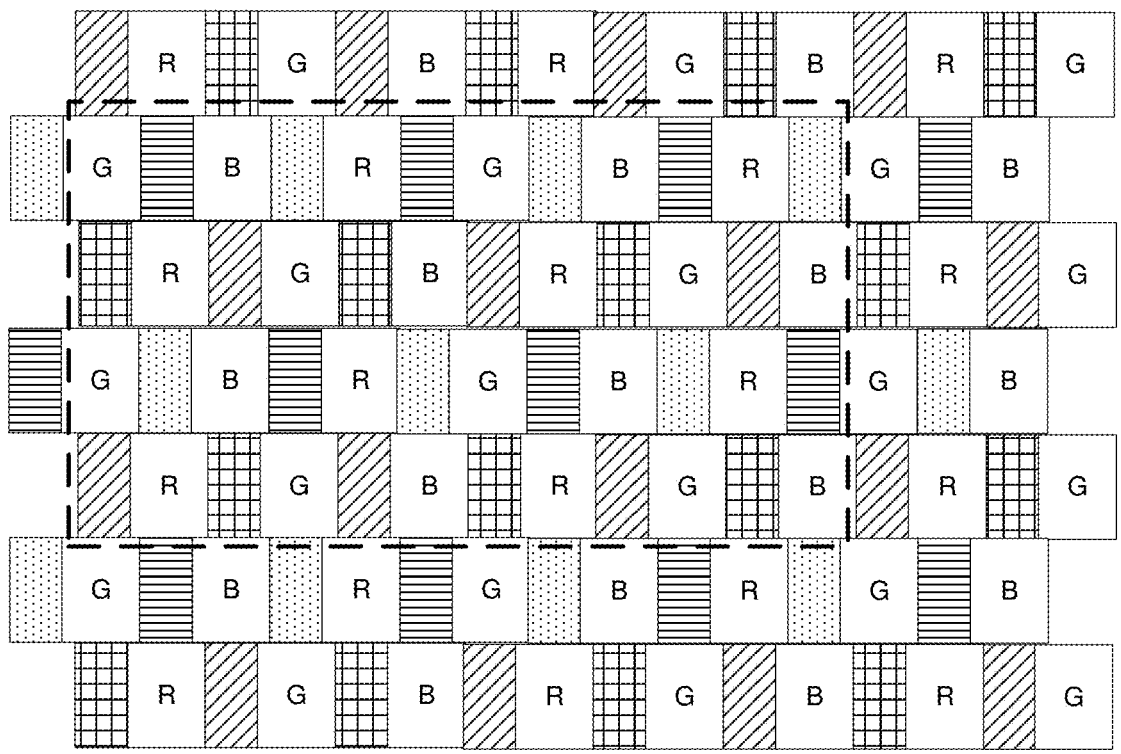
FIG. 6 illustrates a schematic diagram of a display panel according to yet another embodiment of the present disclosure.

FIG. 6 illustrates a schematic diagram of a display panel according to an embodiment of the present disclosure. The display panel of FIG. 6 is similar to that of FIG. 4, except at least that the interfering pixel units P1 to P4 are disposed between adjacent sub-pixels of the display pixel units instead of the display pixel units. Hereinafter, for the sake of clarity, only the different parts will be described in detail.

In the example of FIG. 6, each of the display pixel units comprises three sub-pixels which are a red sub-pixel R, a green sub-pixel G, and a blue sub-pixel B, and the three color sub-pixels R, G, B are arranged in a form of an array in a predetermined rule, wherein every two adjacent sub-pixels have one interfering pixel unit disposed therebetween. For example, as shown in FIG. 6, in a first row, interfering pixel units and sub-pixels are alternately arranged in an order of P3, R, P2, G, P3, B, and P2; in a second row, interfering pixel units and sub-pixels are alternately arranged in an order of P1, G, P4, B, P1, R, and P4; in a third row, interfering pixel units and sub-pixels are alternately arranged in an order of P2, R, P3, G, P2, B, and P3; and in a fourth row, interfering pixel units and sub-pixels are alternately arranged in an order of P4, G, P1, B, P4, R, and P1, and so on, thereby forming a periodically repeating arrangement pattern. One such repeating unit is as shown by a dashed box in FIG. 6. That is, one or more (for example, two) interfering pixel units are instead formed at positions where one or two sub-pixels are originally formed. In the present embodiment, if a certain sub-pixel (for example, an R sub-pixel) in one pixel is replaced with an interfering pixel unit, in a next pixel having an interfering pixel unit added therein, a sub-pixel of another color, for example, a G sub-pixel or a B sub-pixel, is replaced with the interfering pixel unit, to avoid a local color shift. As compared with the examples of FIGS. 4 and 5, characteristic parameters of the interfering pixel units of FIG. 6 may be adjusted accordingly to adapt to sizes and arrangement conditions of the sub-pixels.

Although the above embodiments is described by taking the R, G, and B sub-pixels as an example, it should be apparent to those skilled in the art that the embodiments of the present disclosure are not limited thereto, and the sub-pixels of the display pixel units and the arrangement thereof may be selected as needed.

Although one interfering pixel unit is disposed between adjacent display pixel units or adjacent sub-pixels in the above embodiments, the embodiments of the present disclosure are not limited thereto. A number of interfering pixel units between adjacent display pixel units or sub-pixels and an arrangement thereof may be adjusted as needed, for example, two interfering pixel units may be disposed between adjacent display pixel units or sub-pixels in a manner of alternately repeated.

Although the interfering pixel units are uniformly and periodically distributed throughout the entire display panel in the above embodiments, the embodiments of the present disclosure are not limited thereto. As an example, the interfering pixel units may be distributed over a specific area on the display panel, for example, an area for displaying sensitive information. As another example, a first type of interfering pixel units may be distributed in a central area of the display panel, and a second type of interfering pixel units may be distributed in an edge area of the display panel, thereby realizing different anti-peep angle ranges.

Figure 7:
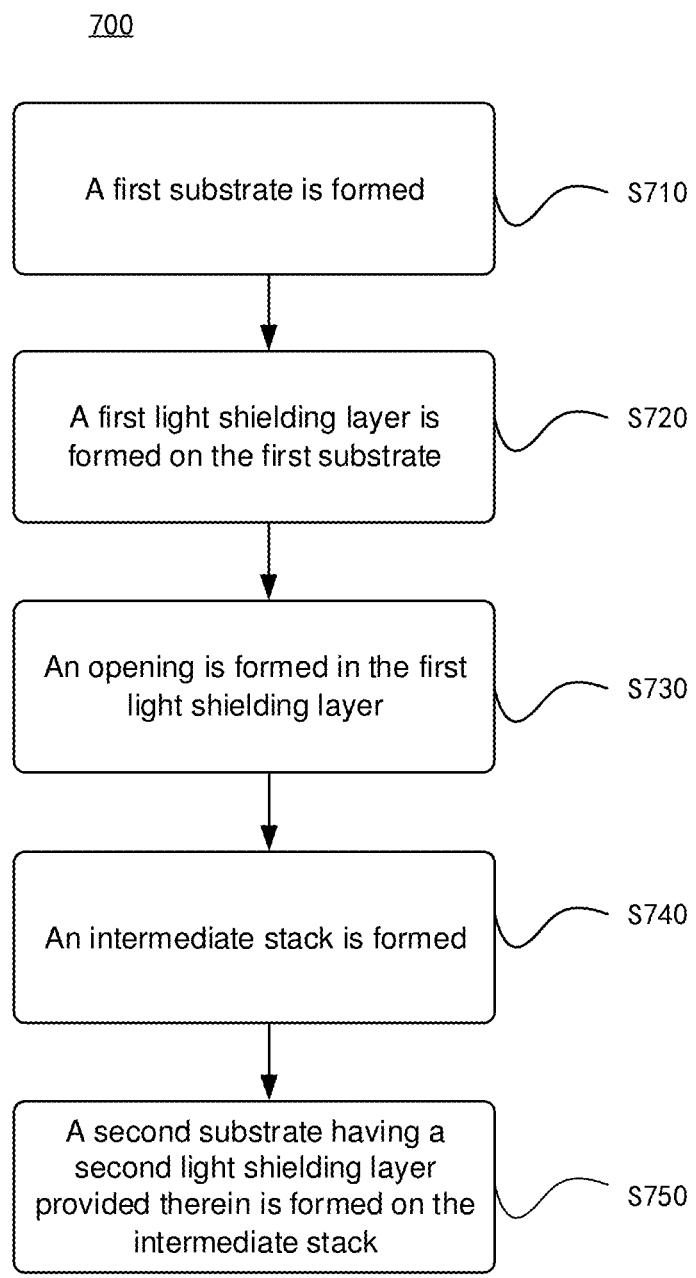
FIG. 7 illustrates a flowchart of a method for manufacturing a pixel unit according to an embodiment of the present disclosure.

FIG. 7 illustrates a flowchart of a method 700 for manufacturing a pixel unit according to an embodiment of the present disclosure. The method 700 may be used to form the pixel units as shown in FIGS. 1-3. Therefore, it should be understood that the corresponding description and illustration of the pixel units above with reference to FIGS. 1-3 are also applicable to the description of the method steps in FIG. 7, and the repeated contents will not be described in detail here again.

In step S710, a first substrate is formed. For example, a transparent substrate may be formed as the first substrate.

In step S720, a first light shielding layer is formed on the first substrate. For example, a black matrix may be disposed on the first substrate as the first light shielding layer.

In step S730, an opening is formed in the first light shielding layer. The opening may be formed, for example, by forming a slit of a predetermined width on the black matrix.

In step S740, an intermediate stack is formed, wherein the intermediate stack at least partially covers the first light shielding layer. For example, a first flat layer, a common electrode, an insulating layer, a pixel electrode, a liquid crystal layer, a second flat layer, etc. may be formed in turn on the first light shielding layer.

In step S750, a second light shielding layer is formed on the intermediate stack, so that projection of the second light shielding layer on the first substrate is located within projection of the opening on the first substrate. The second light shielding layer may be formed in the same layer as that of a black matrix and a color film layer of a display pixel unit in a display panel, as shown in FIG. 3.

Figure 8:
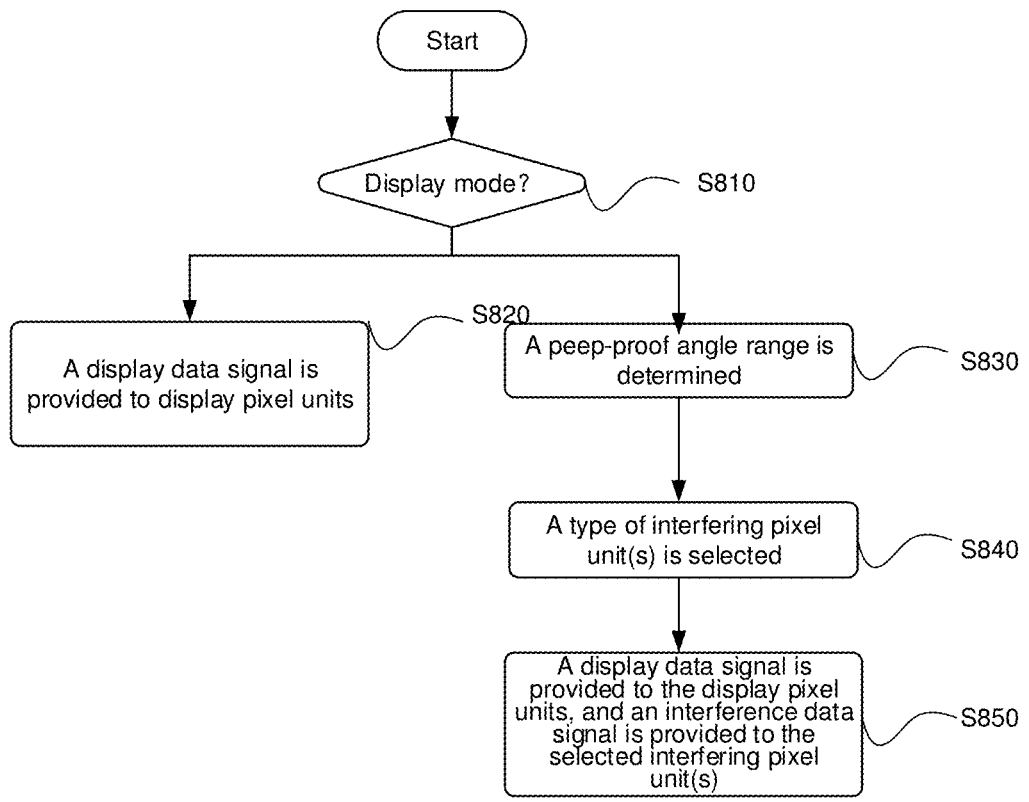
FIG. 8 illustrates a flowchart of a method for driving a display panel according to an embodiment of the present disclosure.

FIG. 8 illustrates a flowchart of a method 800 for driving a display panel according to an embodiment of the present disclosure. The method 800 may be used to drive the display panels shown in FIGS. 4-6. Therefore, it should be understood that the corresponding description and illustration of the display panels above with reference to FIGS. 4-6 are also applicable to the description of the method steps in FIG. 8, and the repeated contents will not be described in detail here again.

In step S810, it is determined whether an operation mode is a normal display mode or a anti-peep display mode, and if the operation mode is the normal display mode, the process proceeds to step S820; otherwise, the process proceeds to step S830.

In step S820, a display data signal is provided to display pixel units to present a normal display picture.

In this step, interfering pixel units may be disabled so as not to affect the normal display. The so-called "disabled" may be implemented in various ways, for example, by applying a driving voltage of 0V to the interfering pixel units (i.e., not providing any data signal to the interfering pixel units), so that the interfering pixel units are not lit up, thereby not affecting the normal display.

In some embodiments, a display data signal may also be provided to both of the display pixel units and the interfering pixel units in this step, which may simplify the operation. In this case, brightness of a display image seen by a user in an angle range which is affected by the interfering pixel units is higher than that of a display image seen by the user in other ranges (the difference in brightness is related to a set ratio of a number of the interfering pixel units relative to a number of the display pixel units, wherein the higher the ratio, the larger the difference in brightness), which may bring about a display effect different from that of a conventional display apparatus.

In step S830, a required anti-peep angle range is determined. As described above, the interfering pixel units P1 to P4 and combinations thereof may be used to provide a plurality of different anti-peep angle ranges, and an example is given in Table 2 below.

TABLE 2

| Anti-peep angle range | Interfering pixel unit |
| --- | --- |
| −90°~90° | None |
| −10°~10° | P4 |
| −20°~−10° | P2 and P3 |
| 10°~20° | P1 and P3 |
| −20°~20° | P3 |
| 10°~30° | P1 |
| −30°~−10° | P2 |

As may be seen from Table 2, the interfering pixel units P1 to P4 and the combinations thereof may provide six different anti-peep angle ranges. These available angle ranges may be preset as multiple options for selection by users, or one of the available angle ranges may be used directly as a default option.

In this step, one of the options may be directly used by default as an anti-peep angle range, or one of the options may also be determined by a user as an anti-peep angle range by selecting the option. In some other embodiments, one of the options may also be automatically selected as an anti-peep angle range according to a position of an observer. For example, biometric identification such as human eye tracking, facial recognition, etc. may be used to determine the position where the observer is located, so as to determine which of the available anti-peep angles the position of the observer falls within, and select the anti-peep angle range.

In step S840, a type of interfering pixel unit(s) to be used is selected according to the anti-peep angle range determined in step S830. For example, the interfering pixel unit(s) may be selected according to Table 2 above. If it is determined in step S830 that the desired anti-peep angle range is 10°~30°, the interfering pixel unit P1 is selected; if the desired anti-peep angle range is −20°~−10°, a combination of the interfering pixel units P2 and P3 is selected.

In step S850, a display data signal is provided to the display pixel units in the display panel to present a normal display picture, and an interference data signal is provided to the type of interfering pixel unit(s) determined in step S840 in the display panel, to present an interference picture outside the anti-peep angle range. For example, an interference voltage signal, such as a Voltage OPerating (VOP) signal, may be applied to a data line(s) corresponding to the interfering pixel unit(s), thereby presenting a white picture, for example, an L255 white picture, outside the anti-peep angle range as an interference picture.

Figure 9A:
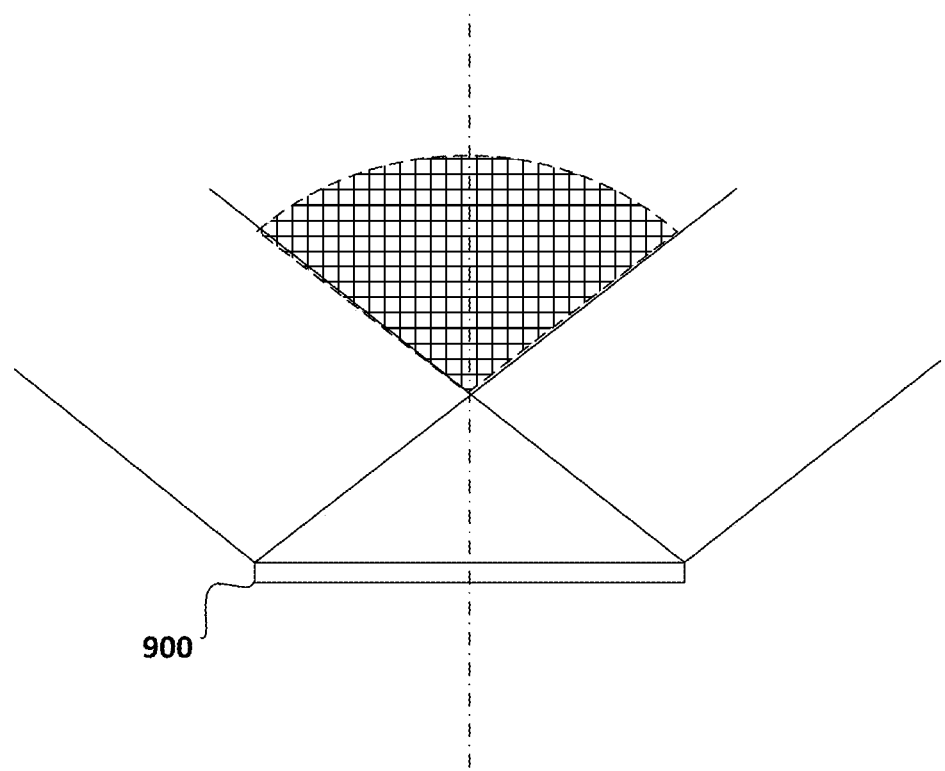
FIG. 9A illustrates a schematic diagram of an anti-peep effect according to an embodiment of the present disclosure.
Figure 9B:
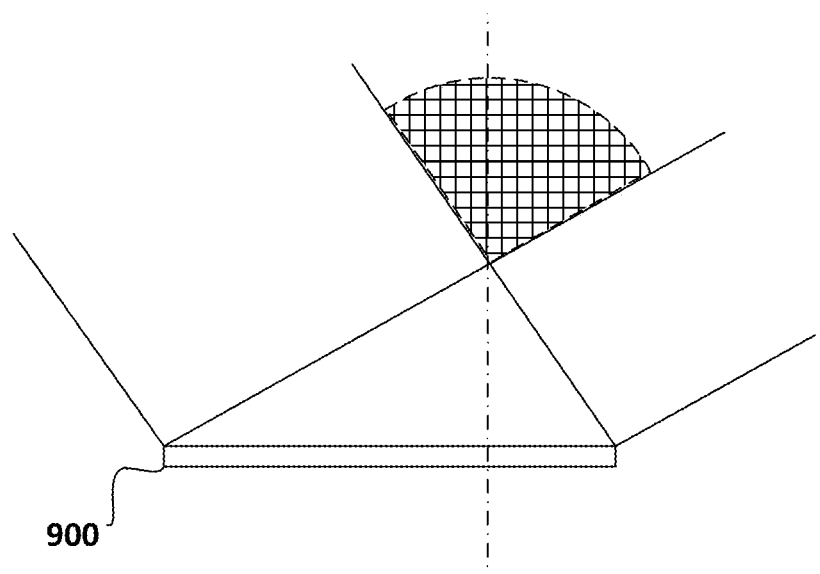
FIG. 9B illustrates a schematic diagram of an anti-peep effect according to another embodiment of the present disclosure.

FIGS. 9A and 9B illustrate anti-peep effects of different anti-peep angle ranges according to an embodiment of the present disclosure respectively, wherein a display panel 900 may be implemented using any of the display panels described above with reference to FIGS. 4-6. As shown in FIGS. 9A and 9B, an angle range in which an interference picture is presented is superimposed with an angle range in which a normal display picture is presented to form an anti-peep angle range (represented by a shadow), so that an observer located within the anti-peep angle range may see the normal display picture, and an observer outside the range may not see the normal display picture, thus realizing an anti-peep function. As may be seen from FIGS. 9A and 9B, the anti-peep angle range of FIG. 9A is symmetrical with respect to a normal of the display panel (indicated by a dot dashed line), and the anti-peep angle range of FIG. 9B is asymmetrical with respect to the normal of the display panel. The anti-peep angle range of FIG. 9A is greater than that of FIG. 9B.

It should be understood that the above steps S830 and S840 are performed in a case where multiple types of interfering pixel units are provided. If one type of interfering pixel units are provided in the display panel, the above steps S830 and S840 may be omitted, and correspondingly the interference data signal may be provided to all the interfering pixel units in step S850.

The embodiments of the present disclosure provide a pixel unit which allows light to be transmitted towards the outside within a preset angle range by providing two light shielding layers therein, so that the pixel unit may be used for providing an interference picture in the anti-peep display.

The pixel unit according to the embodiments of the present disclosure may be applied as an interfering pixel unit for providing an interference picture in a display panel to replace a part of pixel units for normal display, so that an angle range in which a normal display picture is presented is superimposed with an angle range in which an interference picture is presented, to form anti-peep angle range for anti-peep purposes. This structure does not require a multi-layer liquid crystal cell structure, so that the overall structure is simple and has a small thickness, and this structure does not require a backlight plate which is specially designed, so that the structure may be applied more widely.

In the embodiments of the present disclosure, a plurality of different types of interfering pixel units may be designed by setting internal structural parameters of the interfering pixel units, wherein each type of interfering pixel units provides a corresponding anti-peep angle range. The interfering pixel units may be arranged in a display panel in a variety of ways to adapt to different needs. Various segmented anti-peep angle ranges may be selected by selecting one or more of the plurality of different types of interfering pixel units, thereby providing a more flexible use experience.

Although the present disclosure has been described with reference to several exemplary embodiments, it should be understood that the terms used are illustrative and exemplary instead of being restrictive. The present disclosure may be embodied in a variety of forms without departing from the spirit or essence of the present disclosure, and therefore it should be understood that the above-described embodiments are not limited to any details described above, and should be widely explained within the spirit and scope defined by the appended claims. Therefore, all changes and modifications which fall within the scope of the claims or the equivalents thereof should be covered by the appended claims.

We claim:

1. A pixel unit, comprising:
a first substrate;
an intermediate stack disposed on the first substrate;
a first light shielding layer disposed on a side of the intermediate stack adjacent to the first substrate, wherein the first light shielding layer has an opening provided therein; and
a second light shielding layer disposed on a side of the intermediate stack away from the first substrate;
wherein the second light shielding layer is disposed so that projection of the opening on the first substrate is located within projection of the second light shielding layer on the first substrate;
wherein the first light shielding layer and the second light shielding layer are configured to satisfy the following formula:

$b = a + \tan\theta 1 \times h + \tan\theta 2 \times h$, where a represents a width of the opening, b represents a width of the second light shielding layer, h represents a distance between the first light shielding layer and the second light shielding layer, θ1 represents an angle of a light path from an edge of the opening to an edge of the second light shielding layer on one side of the opening with respect to a normal of the first substrate, and θ2 represents an angle of a light path from an edge of the opening to an edge of the second light shielding layer on the other side of the opening opposite to said one side with respect to the normal of the first substrate.

2. The pixel unit according to claim 1, further comprising a second substrate disposed on the intermediate stack, wherein:
the second light shielding layer is disposed in the second substrate; and
the first light shielding layer is disposed on the first substrate and is at least partially covered by the intermediate stack.

3. The pixel unit according to claim 1, wherein a center of the projection of the opening on the first substrate coincides with a center of the projection of the second light shielding layer on the first substrate.

4. The pixel unit according to claim 1, wherein a center of the projection of the opening on the first substrate deviates from a center of the projection of the second light shielding layer on the first substrate.

5. The pixel unit according to claim 1, wherein the opening has a slit shape.

6. The pixel unit according to claim 1, wherein each of the first light shielding layer and the second light shielding layer is a black matrix.

7. The pixel unit according to claim 1, wherein the intermediate stack comprises:
a first flat layer disposed on the first substrate to at least partially cover the first light shielding layer;
a common electrode disposed on the first flat layer;
an insulating layer disposed on the common electrode;
a pixel electrode disposed on the insulating layer;
a liquid crystal layer disposed on the pixel electrode; and
a second flat layer disposed on the liquid crystal layer.

8. A display panel, comprising:
a plurality of display pixel units arranged in an array; and
at least one interfering pixel unit distributed in the array, wherein each of the at least one interfering pixel unit is implemented using the pixel unit according to claim 1.

9. The display panel according to claim 8, wherein the at least one interfering pixel unit is disposed between respective adjacent ones of the display pixel units.

10. The display panel according to claim 8, wherein each of the display pixel units comprises a plurality of sub-pixels, and the at least one interfering pixel unit is disposed between respective adjacent ones of the sub-pixels.

11. The display panel according to claim 8, wherein the at least one interfering pixel unit comprises a first interfering pixel unit and a second interfering pixel unit, wherein the first interfering pixel unit is different from the second interfering pixel unit in at least one of: a width of an opening, a width of a second light shielding layer, a distance between a first light shielding layer and the second light shielding layer, and an offset value of a center of projection of the second light shielding layer on a first substrate with respect to a center of projection of the opening on the first substrate.

12. The display panel according to claim 11, wherein the first interfering pixel unit and the second interfering pixel unit are distributed in the array in a periodically repeating manner.

13. A method for manufacturing a pixel unit that includes: a first substrate; an intermediate stack disposed on the first substrate; a first light shielding layer disposed on a side of the intermediate stack adjacent to the first substrate, wherein the first light shielding layer has an opening provided therein; and a second light shielding layer disposed on a side of the intermediate stack away from the first substrate, wherein the second light shielding layer is disposed so that projection of the opening on the first substrate is located within projection of the second light shielding layer on the first substrate, the method comprising:
forming the first substrate;
forming the first light shielding layer on the first substrate;
forming the opening in the first light shielding layer;
forming the intermediate stack on the first light shielding layer; and
forming the second light shielding layer on the intermediate stack, so that projection of the opening on the first substrate is located within projection of the second light shielding layer on the first substrate;

wherein the first light shielding layer and the second light shielding layer are formed with a configuration that satisfies the following formula:

$$b = a + \tan\theta_1 \times h + \tan\theta_2 \times h,$$

where a represents a width of the opening, b represents a width of the second light shielding layer, h represents a distance between the first light shielding layer and the second light shielding layer, θ1 represents an angle of a light path from an edge of the opening to an edge of the second light shielding layer on one side of the opening with respect to a normal of the first substrate, and θ2 represents an angle of a light path from an edge of the opening to an edge of the second light shielding layer on the other side of the opening opposite to said one side with respect to the normal of the first substrate.

14. A method for driving a display panel that comprises a plurality of display pixel units arranged in an array and at least one interfering pixel unit distributed in the array, wherein each of the at least one interfering pixel unit is implemented using a pixel unit that includes: a first substrate; an intermediate stack disposed on the first substrate; a first light shielding layer disposed on a side of the intermediate stack adjacent to the first substrate, wherein the first light shielding layer has an opening provided therein; and a second light shielding layer disposed on a side of the intermediate stack away from the first substrate, wherein the second light shielding layer is disposed so that projection of the opening on the first substrate is located within projection of the second light shielding layer on the first substrate, and wherein the the first light shielding layer and the second light shielding layer are configured to satisfy the following formula:

$$b = a + \tan\theta_1 \times h + \tan\theta_2 \times h,$$

where a represents a width of the opening, b represents a width of the second light shielding layer, h represents a distance between the first light shielding layer and the second light shielding layer, θ1 represents an angle of a light path from an edge of the opening to an edge of the second light shielding layer on one side of the opening with respect to a normal of the first substrate, and θ2 represents an angle of a light path from an edge of the opening to an edge of the second light shielding layer on the other side of the opening opposite to said one side with respect to the normal of the first substrate, the method comprising:

in a normal display mode, providing a display data signal to display pixel units in the display panel; and in an anti-peep display mode, providing the display data signal to the display pixel units in the display panel, and providing an interference data signal to at least a part of the at least one interfering pixel unit in the display panel.

15. The method according to claim 14, wherein the interfering pixel units are disabled in the normal display mode.

16. The method according to claim 14, wherein the interfering pixel units comprise a first interfering pixel unit and a second interfering pixel unit, wherein the first interfering pixel unit is different from the second interfering pixel unit in at least one of: a width of the opening, a width of the second light shielding layer, a distance between the first light shielding layer and the second light shielding layer, and an offset value of a center of projection of the second light shielding layer on the first substrate relative to a center of projection of the opening on the first substrate, and the method further comprises:

in the anti-peep display mode, selecting one or both of the first interfering pixel unit and the second interfering pixel unit according to an angle range desired for picture presentation, wherein said providing an interference data signal comprises providing the interference data signal to the selected interfering pixel unit(s).

17. The method according to claim 16, further comprising:

identifying a position where an observer is located through biometric identification; and determining the angle range desired for picture presentation according to the position where the observer is located.

18. The method according to claim 14, wherein the interference data signal is a Voltage OPerating (VOP) signal for the display panel.

* * * * *